(12) United States Patent
Chen et al.

(10) Patent No.: US 12,204,602 B2
(45) Date of Patent: Jan. 21, 2025

(54) PAGE DISPLAY METHOD AND ELECTRONIC DEVICE

(71) Applicant: GUANGDONG OPPO MOBILE TELECOMMUNICATIONS CORP., LTD., Guangdong (CN)

(72) Inventors: Xucheng Chen, Guangdong (CN); Yiding Wang, Guangdong (CN); Yutong Qiu, Guangdong (CN); Ran Yang, Guangdong (CN); Ying Pan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 137 days.

(21) Appl. No.: 18/066,860

(22) Filed: Dec. 15, 2022

(65) Prior Publication Data

US 2023/0117213 A1    Apr. 20, 2023

Related U.S. Application Data

(63) Continuation of application No. PCT/CN2021/098660, filed on Jun. 7, 2021.

(30) Foreign Application Priority Data

Jun. 16, 2020 (CN) .......................... 202010550583.0

(51) Int. Cl.
*G06F 16/957* (2019.01)
*G06F 3/0482* (2013.01)
(Continued)

(52) U.S. Cl.
CPC ........ *G06F 16/9577* (2019.01); *G06F 3/0482* (2013.01); *G06F 3/0484* (2013.01);
(Continued)

(58) Field of Classification Search
CPC .... G06F 16/9577; G06F 9/451; G06F 40/109; G06F 40/58; G06F 3/0482; G06F 3/0484; G06F 3/0488; G06F 2203/04803
(Continued)

(56) References Cited

U.S. PATENT DOCUMENTS 7,688,327 B2 * 3/2010 Robotham .......... G06F 16/9577
709/219
7,864,186 B2 * 1/2011 Robotham ............ G06F 9/5055
715/744
(Continued)

FOREIGN PATENT DOCUMENTS

CN   101576878   11/2009
CN   104331474   2/2015
(Continued)

OTHER PUBLICATIONS

CNIPA, Second Office Action for CN Application No. 202010550583.0, Nov. 30, 2023.
(Continued)

*Primary Examiner* — William D Titcomb
(74) *Attorney, Agent, or Firm* — Hodgson Russ LLP

(57) ABSTRACT

A page display method and an electronic device are disclosed. The method includes: displaying at least one component on a page, the component is configured to display first content; and the first content has a mapping relationship with second content, and the second content is entire or part of page content covered by the component; and updating the first content or the second content in response to a position of the component being changed relative to the page.

20 Claims, 13 Drawing Sheets

(51) Int. Cl.
*G06F 3/0484* (2022.01)
*G06F 3/0488* (2022.01)
*G06F 9/451* (2018.01)
*G06F 40/109* (2020.01)
*G06F 40/58* (2020.01)

(52) U.S. Cl.
CPC ............ *G06F 3/0488* (2013.01); *G06F 9/451* (2018.02); *G06F 40/109* (2020.01); *G06F 40/58* (2020.01); *G06F 2203/04803* (2013.01); *G06F 2203/04804* (2013.01)

(58) Field of Classification Search
USPC ......................................................... 715/747
See application file for complete search history.

(56) References Cited

U.S. PATENT DOCUMENTS

| | | | | |
|---|---|---|---|---|
| 2007/0263007 | A1* | 11/2007 | Robotham | G06F 3/1454 345/581 |
| 2010/0194753 | A1* | 8/2010 | Robotham | G06F 9/5055 345/428 |
| 2013/0232430 | A1* | 9/2013 | Reitan | G09G 3/003 715/765 |
| 2014/0164907 | A1* | 6/2014 | Jung | G06F 3/0482 715/234 |
| 2015/0128037 | A1* | 5/2015 | Lee | G06F 3/0481 715/703 |
| 2015/0143275 | A1* | 5/2015 | Lee | G06F 3/0488 715/810 |
| 2015/0294024 | A1* | 10/2015 | Zhang | G06F 16/9562 709/217 |
| 2016/0026253 | A1* | 1/2016 | Bradski | H04N 13/128 345/8 |
| 2016/0170600 | A1* | 6/2016 | Horiike | G06F 3/0486 715/769 |
| 2017/0109936 | A1* | 4/2017 | Powderly | G06F 3/016 |
| 2018/0143750 | A1* | 5/2018 | Ye | H04M 1/72436 |
| 2019/0094981 | A1* | 3/2019 | Bradski | G06V 40/168 |
| 2020/0106965 | A1* | 4/2020 | Malia | G06T 11/00 |

FOREIGN PATENT DOCUMENTS

| | | |
|---|---|---|
| CN | 104615592 | 5/2015 |
| CN | 107391017 | 11/2017 |
| CN | 108595445 | 9/2018 |
| CN | 109246464 | 1/2019 |
| CN | 109669742 | 4/2019 |

OTHER PUBLICATIONS

EPO, Extended European Search Report for EP Application No. 21825554.5, Jan. 2, 2024.
CNIPA, First Office Action for CN Application No. 202010550583.0, Mar. 18, 2023.
CNIPA, Decision of Rejection for CN Application No. 202010550583.0, Mar. 16, 2024.
WIPO, International Search Report and Written Opinion for PCT/CN2021/098660, Sep. 7, 2021.

* cited by examiner displaying at least one component on a page, the component is configured to display first content, where the first content has a mapping relationship with second content, and the second content is entire or part of page content covered by the component

↓ updating the first content in response to a position of the component being changed relative to the page

FIG. 1 displaying at least one component on a page; the component is configured to display first content, where the first content is a translation of second content, and the second content is entire or part of page content covered by the component

FIG. 2

PAGE DISPLAY METHOD AND ELECTRONIC DEVICE

CROSS-REFERENCE TO RELATED APPLICATIONS

This application is a continuation of International Application No. PCT/CN2021/098660, filed Jun. 7, 2021, which claims priority to Chinese Patent Application No. 202010550583.0, filed Jun. 16, 2020, the entire disclosures of which are incorporated herein by reference.

TECHNICAL FIELD

The disclosure relates to the field of computer technologies, and more particularly, to a page displaying method, and an electronic device.

BACKGROUND

With the development of communication technology, terminals have gradually become the main channels for users to perform operations such as finding data, obtaining information, social chatting, and viewing documents. However, the current way of presenting information on the terminal page is relatively single and cannot meet the diversified requirements of different users, which results in a bad user experience.

SUMMARY

Embodiments of the disclosure provide a page displaying method, and an electronic device. Technical solutions of the embodiments of the disclosure are as follows.

In an aspect, the embodiments of the disclosure provide a page displaying method. The method includes: displaying at least one component on a page, where the component is configured to display first content, the first content has a mapping relationship with second content, and the second content is entire or part of page content covered by the component; and updating the first content in response to a position of the component being changed relative to the page.

In another aspect, the embodiments of the disclosure provide another page displaying method. The method includes:

displaying at least one component on a page, where the component is configured to display first content, the first content is a translation of second content, and the second content is entire or part of page content covered by the component.

In still another aspect, the embodiments of the disclosure provide an electronic device. The electronic device includes a processor and a memory. The memory is stored with a computer program configured to be loaded and executed by the processor to implement operations of the above method.

BRIEF DESCRIPTION OF THE DRAWINGS

FIG. 1 is a schematic flowchart illustrating a page displaying method according to some embodiment of the disclosure;

FIG. 2 is a schematic flowchart illustrating another page displaying method according to some embodiment of the disclosure;

DETAILED DESCRIPTION OF PREFERRED EMBODIMENTS

Figure 3:
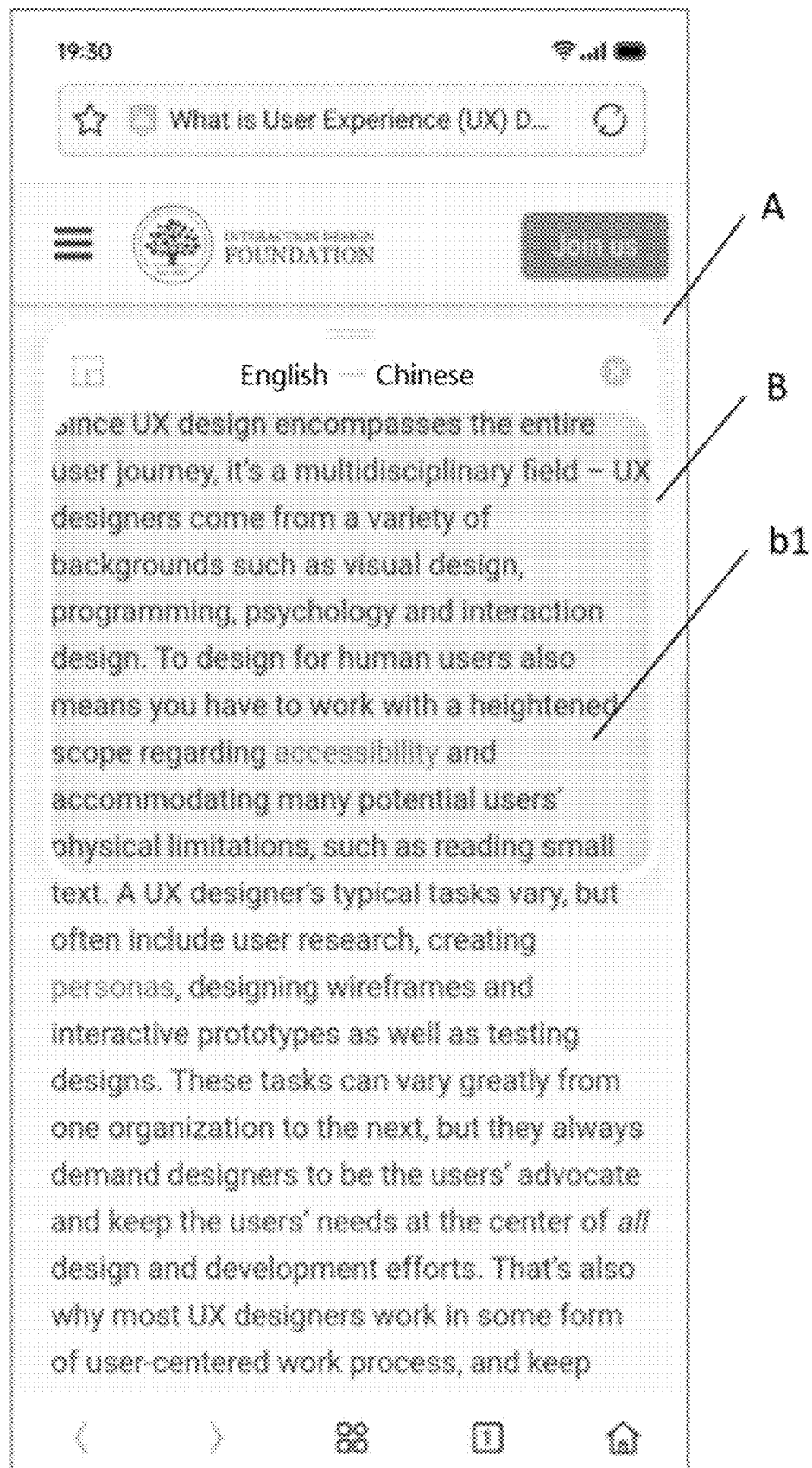
FIG. 3 is a schematic diagram illustrating a component of the page displaying method according to some embodiment of the disclosure.

The technical solutions in the embodiments of the disclosure will be clearly and completely described below with reference to the drawings in the embodiments of the disclosure. Apparently, the described embodiments are only a part of rather than all the embodiments of the disclosure. Based on the embodiments of the disclosure, all other embodiments obtained by those of ordinary skill in the art without creative efforts shall fall within the protection scope of the disclosure.

It should be understood that the terms "first," "second" and the like in the description of the disclosure are used for description object, and should not be construed as indicating or implying relative importance. In addition, it should be noted that, unless otherwise specified and defined, the terms "including" and "having" and any variations thereof in the description of the disclosure are intended to cover non-exclusive inclusions. For example, a process, a method, a system, a product, or a device that includes a series of operations or units is not limited to the listed steps or units. In at least one alternative embodiments, unlisted steps or units may be included, or other steps or units inherent to these processes, methods, products or devices may be included. For those of ordinary skill in the art, specific meanings of the above terms in the disclosure may be understood according to specific situations. In addition, unless otherwise specified, the term "plurality" in the description of the disclosure means two or more. The term "and/or" is used to describe an association relationship of associated objects and represents that there may be three relationships. For example, A and/or B may represent the following three cases: only A exists, both A and B exist, and only B exists. The character "/" generally indicates that there is an "or" relationship between the associated objects before and after the character.

In the related art, to find and browse related information of target content, the user usually needs to copy and paste the target content into a search box, and then click to search, which results in a long operation path and is inconvenient to use. In addition, when there is a large amount of target content that needs to obtain related information, the user needs to search for the target content one by one, which is very inconvenient.

For example, when the user needs to search for a translation of a paragraph of text, there are several manners in the related art as follows. 1. The content to be translated may be pasted into a translation software through copy and paste operations, and the translation may be performed after selecting a target language. However, the whole process is cumbersome and it requires a translation software installed separately, which takes up resources. 2. In some application scenarios, the user may also perform a long press to select the text to be translated and call up a selection menu, select the target language and then complete the translation. However, it is inconvenient to adjust the content of the text to be translated by performing the long press, and this manner can only be implemented for some application scenarios that have been adapted accordingly. 3. When using a translation software, the user may also obtain the text to be translated by taking pictures in this scenario, and the user needs to maintain the terminal stability during the translation process, which is very inconvenient to operate. In addition, the user may only select either a word search mode for a single word, or a mode for translating the entire page, which is time-consuming and inconvenient to adjust the content to be translated.

For another example, when the user is browsing a web page, views a drama review of a certain star, and suddenly wants to see what other dramas the star has been in, the user needs to exit the current web page, search and browse the search page, and then return to the previous web page. In this way, the operations are cumbersome and the continuity of browsing is affected, which results in a terrible user experience.

The disclosure will be described in detail below with reference to specific embodiments.

In some embodiments, a page displaying method is provided as illustrated in FIG. 1. The method may be implemented depending on a computer program, and may be executed on a page displaying apparatus device based on the Von Neumann architecture. The computer program may be integrated into an application or run as a stand-alone utility application.

The page displaying apparatus may be a terminal, in particular, may be a terminal with a touch screen, and the terminal may be an electronic device with a page displaying function. The electronic device includes but is not limited to: a wearable device, a handheld device, a personal computer, a tablet computer, a vehicle-mounted device, a smartphone, a computing device, or one of other processing devices connected to a wireless mode, etc. In different networks, a terminal device may be referred to as different names such as a user equipment, an access terminal, a subscriber unit, a subscriber station, a mobile station, a mobile console, a remote station, a remote terminal, a mobile device, a user terminal, a terminal, a wireless communication device, a user agent or a user apparatus, a cellular phone, a cordless phone, a personal digital assistant (PDA), a terminal device in a 5G network or a future evolved network.

FIG. 1 illustrates a page displaying method according to some embodiment of the disclosure. Specifically, the page displaying method includes:

displaying at least one component on a page; the component is configured to display first content, the first content has a mapping relationship with second content, and the second content is entire or part of page content covered by the component.

In some embodiments, the operation of displaying at least one component on the page may be implemented by control codes of a terminal for implementing executes an operation or a function of the "display component". In practice, the terminal executes the control codes for implementing the operation or function of the "display component", thereby displaying the component on the page.

It can be understood that the component may be a display component implemented by a software module, and the component is an element of a graphical user interface in human-computer interaction. The component includes an area for display. In at least one alternative embodiments, the component may further include an area for control.

The form of the component may be one of various elements such as a control, a floating window, a plug-in, a box, or a combination thereof. In some embodiments, the component may be a combination of a display box and a control, the display box is configured to display, and the control is located in the area for control and configured to control the component. In addition, the component may also be a floating window. FIG. 3 illustrates an exemplary floating window according to some embodiments.

In some embodiments, the page refers to a page displayed on the display screen of the terminal (for example, A in FIG. 3). For example, the page may be a webpage browsed by the user on the display screen, a communication interface for the user to communicate with others, a page in the state of editing by the user, or a page for the user's offline reading such as a page of a reading software for reading an offline book. The page of the embodiments is not limited to these examples. The operation of displaying at least one component on the page may be understood as displaying one or more components within the page. In at least one alternative embodiments, when multiple components are displayed on the page, the multiple components may be displayed on the page in an arrangement such as being arranged up and down, left and right, or mixed. The multiple components may be displayed with an overlapping area or no overlapping area. In addition, the multiple components may have the same size or different sizes. Attributes of the component, such as shape, size, color, or style, may be predetermined by the user or be set as system defaults. Specifically, the shape of the component may be a rectangle, a square, a rectangle with rounded corners, a square with rounded corners, or other shapes; the width of the component may be the same as the width of the display screen, or be less than the width of the display screen; and the height of the component may be the same as the height of the display screen, or may be less than the height of the display screen. The embodiments are not limited to these examples.

The component is configured to display the first content. In some embodiments, the component (for example, B in FIG. 3) may also be configured to display the second content. The second content is the entire or part of the page content covered by the component (for example, b1 in FIG. 3). In some embodiments, "the page content covered by the component" may be understood as follows. Since the component is displayed on the page, the component and the page are overlapped to a certain extent on a display screen to form an overlapped area, and the page content in the overlapped area is taken as the page content covered by the component. Furthermore, the "entire or part of page content covered by the component" may be understood as entire page content or part of the page content in the overlapped area. For example, the overlapped area of the component and the page is referred to as a R area, the content in the R area of the page is referred to as r1+r2, and the first content may be r1+r2, only r1, or only r2. It can be understood that, according to different page types, the second content may include various formats. For example, the second content may include text, an image and/or a video, or other symbols, which is not limited in the disclosure. In some embodiments, it can be understood that when there is a component, the user may control the current page as usual by acting on an area other than the area of the component. For example, the user may perform a sliding operation on the area outside a location of the component, and the terminal may make a normal response on the current page, in which the normal response refers to a response that is the same as when the component is not present, e.g., turning the page. There may be various ways to enable the display of the second content by the component. For example, the entire or part of the area of the component may be set as a transparent state. In this way, when the component is located on the page, the first content which is covered by the area in the transparent state of the component may be visible through the component. Furthermore, the transparent state may be understood as an opacity parameter of the area being less than a threshold (for example, 60%). Specifically, the opacity parameter is in a range of 0%-100%, when the opacity parameter is 100%, the content under the area is completely obscured, and when the opacity parameter is 0%, the area is completely transparent. In addition, the terminal may also obtain the second content in the first, and then re-display the second content in the component by executing display control codes. In some embodiments, the first content is displayed on the display box, in response to a click operation acting in the display box; and the display box is set to be in a transparent state in response to another click operation acting on the display box, thereby displaying the second content in the display box.

In some embodiments, there is a mapping relationship between the first content and the second content. The mapping relationship may be understood as at least one of the following: a mapping between texts, a mapping between text and an image, a mapping between images, a mapping between text and a video, a mapping between an image and a video, and a mapping between videos. Specifically, the mapping relationship may be the mapping between texts, e.g., text and an interpretation corresponding to the text, where the interpretation corresponding to the text may be in the same language as the text, a different language from the text. The mapping relationship may also be the mapping between a noun and an image, such as a noun (e.g., a plant name, an animal name, a place name, a building name) and an image corresponding to the noun, a name (e.g., a celebrity's name, a friend's name, a nickname) and an image corresponding to the name. The mapping relationship may be the mapping between images, such as images of the same item at different periods or images of different parts of the same item (e.g., a mapping between images of a plant and flower/fruit thereof), images of the same person in different periods (e.g., images of a person in childhood and adulthood), images of persons with a special relationship (e.g., a mapping between images of father/mother and children thereof). The mapping relationship may be the mapping between text and a video, such as a program name and a program video corresponding to the program name, a character name and a video corresponding to the character name, and actor's lines and a video corresponding to the lines. The mapping relationship may be the mapping between an image and a video, such as a video screenshot and a video corresponding to the video screenshot, a stage photo and a video corresponding to the stage photo, a character image and a video corresponding to the character image. The mapping relationship may be the mapping between videos, for example, a video and another video related with the video, specifically such as a beginning segment of a video and a corresponding ending segment of the video, a video A and a video B with a same role. The disclosure is not limited to these examples.

With the solution of the embodiments of the disclosure, the user can conveniently search for the associated content corresponding to the target content; and the user can select the target content through the component, which can avoid a delay caused by directly mapping full-page content.

As illustrated in FIG. 2, in some embodiments, the first content is a translation of the second content. In some implementations, the translation of the second content may be a translation of only text in the second content. Specifically, the text in the second content may be extracted in at least one of the following ways: acquiring the text in the second content directly according to page source data, taking a screenshot of an area of the page where the component locates and performing image recognition on the screenshot to extract the text, or performing optical character recognition (OCR) on the page of the screen to extract the text, etc. In some alternative implementations, text information contained in the image and/or video of the second content may be recognized and extracted, and the translation of the second content may be obtained by translating the text extracted from the text and images of the second content.

In some embodiments, the terminal may automatically identify a language of the text in the second content, and details are not described in the disclosure. The user may also manually select the language of the text in the second content. For example, when the terminal recognizes the language incorrectly or the terminal is offline, the user manually sets the language of the text to be translated. Generally, the user may manually set a translation target language which refers to the language of the translation after translating the text. When the user wants to translate English on the page into Chinese, Chinese is taken as the translation target language, and English is taken as the language of the text to be translated. In some embodiments, the terminal may also adopt a default translation target language. For example, Chinese is set as the default translation target language, that is, Chinese is directly taken as the translation language of the second content when the user does not set the translation target language. In some embodiments, the terminal may set a first translation target language and a second translation target language, and the first translation target language has a higher priority than the second translation target language. When the text to be translated does not belong to the first translation target language, the first translation target language is directly taken as the translation language of the second content, and when the text to be translated belongs to the first translation target language, the second translation target language is taken as the translation language of the second content. For example, the first translation target language may be Chinese, and the second translation target language may be English, the terminal translates the second content into Chinese when the text in the second content belongs to a language other than Chinese (such as French, Indian, English, etc.), and the terminal translates the second content into English when the text in the second content belongs to Chinese.

Furthermore, the first content may be obtained based on a network query, or based on a query on a local database of the terminal. In some implementations, the query on the local database of the terminal is performed first, and in response to failing to obtain a result corresponding to the query, the network query is launched. Details are not described in the disclosure.

In this way, by displaying the translation corresponding to the second content in the area of the component, the user is enabled to conveniently translate the target page content. In addition, by displaying the second content and the translation corresponding to the second content in the area of the component, the user is enabled to match the original text with the translation, which is helpful for the user's understanding and learning.

In some embodiments, the page displaying method further includes:
  switching, in response to a first operation, content displayed by the component between the first content and the second content.

Figure 4:
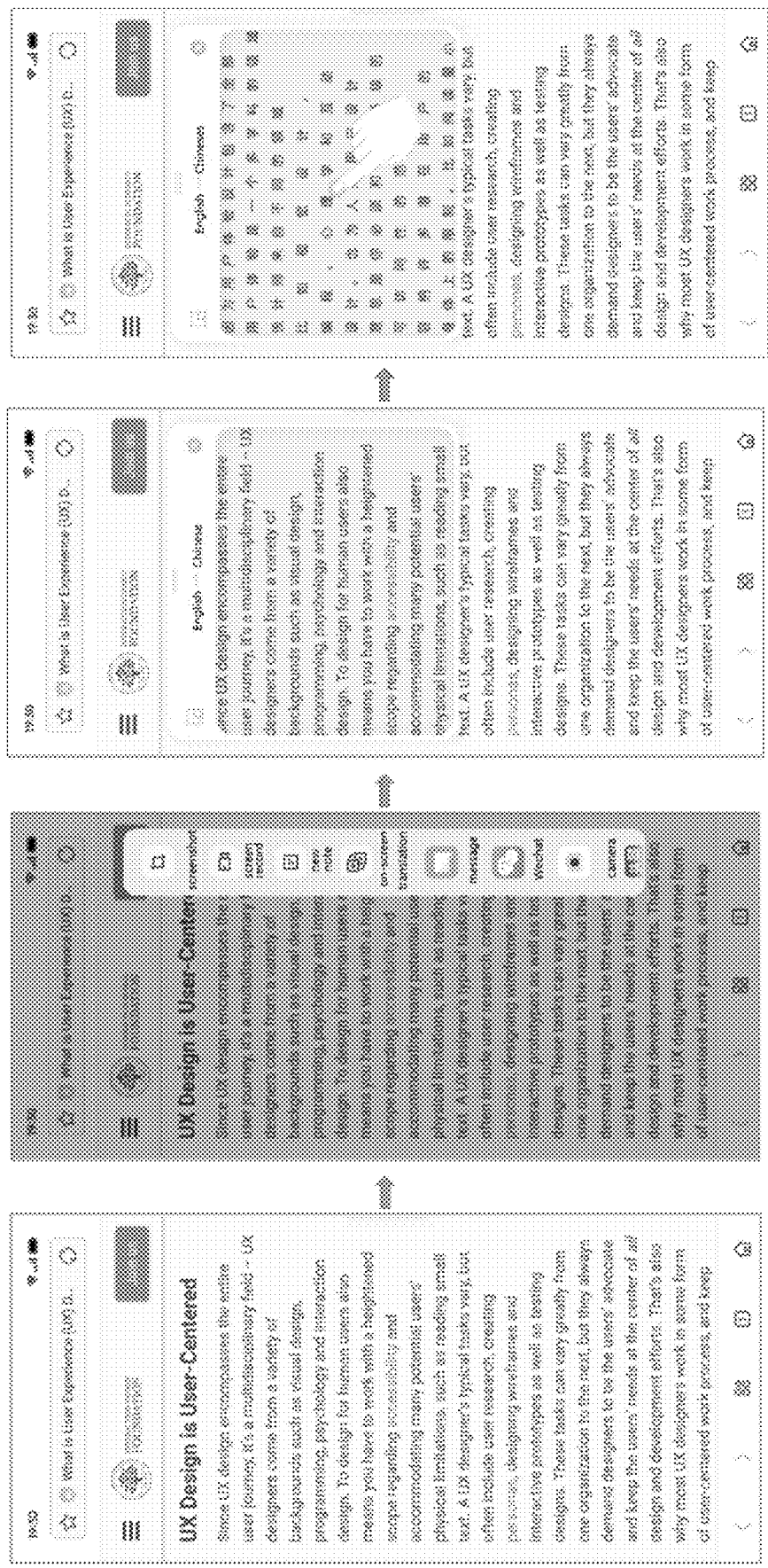
FIG. 4 is a schematic diagram illustrating a scenario for a page displaying method involving calling out the component through a first control according to some embodiment of the disclosure.

Specifically, the first operation (also referred to as a switching operation) may be any type of touch operation, which includes one or more of a click operation, a slide operation, a long press operation, etc. For example, the first operation is the click operation acting on the component, as illustrated in FIG. 4. In some embodiments, the first operation may also be a non-touch operation, for example, an operation of shaking the terminal; in some embodiments, the first operation may also be a voice operation, for example, a voice command such as "executing the translation". The first operation is not specifically limited to these embodiments.

It can be understood that the operation of switching content displayed by the component between the first content and the second content specifically includes: switching the content displayed by the component from the first content to the second content, or from the second content to the first content. Specifically, regarding switching the second content to the first content, in a case where the first content has been loaded into a cache of the terminal, the terminal reads the first content directly from the cache for display, and in a case where the first content has not been loaded, the terminal first needs to acquire the first content before the display. In an exemplary application scenario, the component displays the original text by default, when the user clicks the component for the first time, the terminal obtains the translation and stores the translation in the cache, the display of the component is switched to the translation, and when the user clicks the component again, the display of the component is switched to the original text. In response to another user's click operation acting on the component, the terminal reads the translation from the cache and displays the translation on the component to save loading time. Apparently, the terminal may alternatively re-execute the first content acquisition process of the disclosure each time it requires to switch from the second content to the first content, which is not specifically limited in the embodiments.

In this way, the user can read the contents through a simple operation to switch the displayed content between the page content and the translation corresponding to the page content in the display area of the component. As such, the user can match the original text with the translation, which is helpful for the user's understanding and learning.

In some embodiments, the page displaying method further includes:
  updating the first content and/or the second content in response to a position of the component being changed relative to the page.

Figure 5:
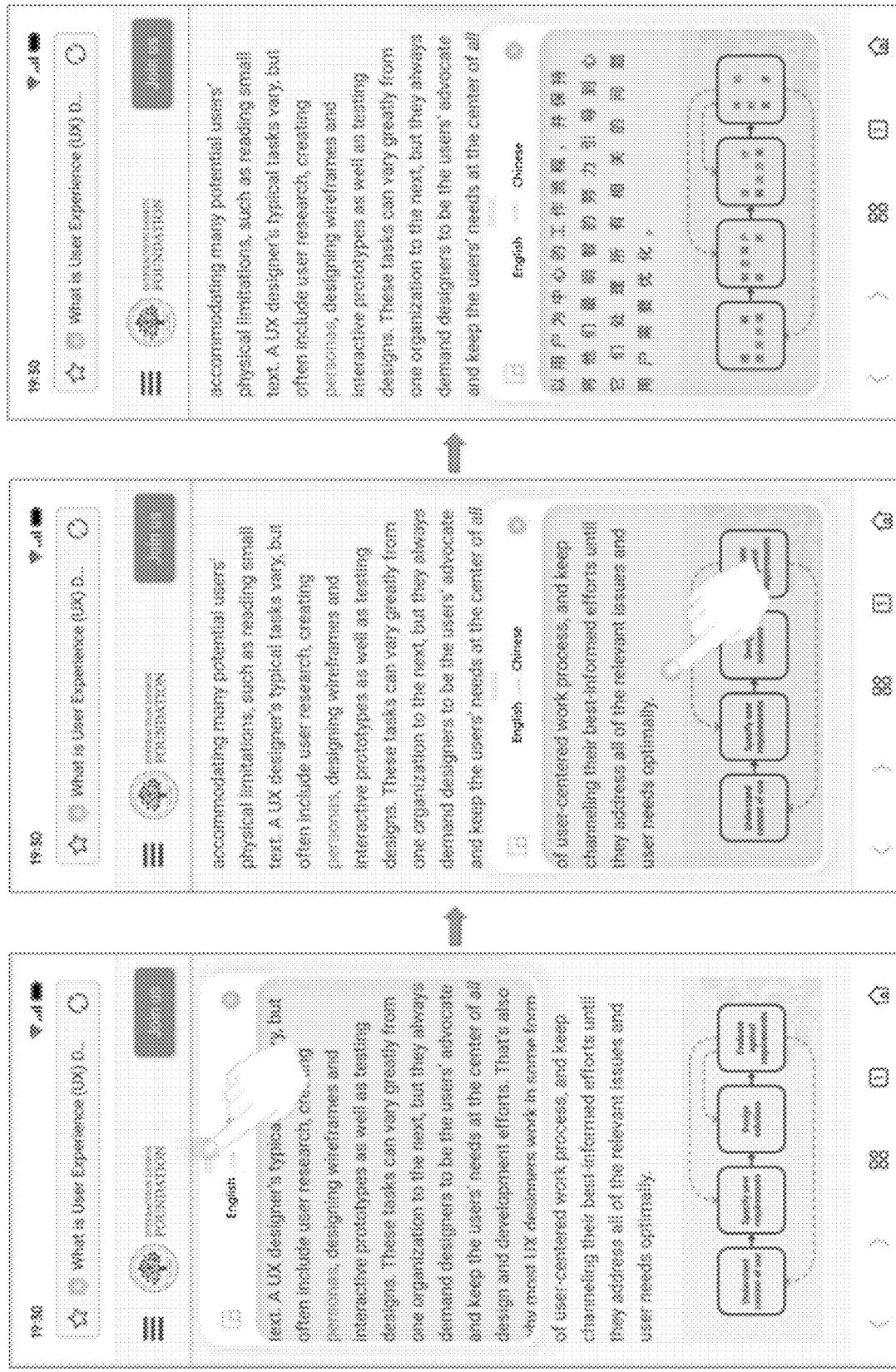
FIG. 5 is a schematic diagram illustrating a scenario for a page displaying method involving dragging the component according to some embodiment of the disclosure.

The wordings that the position of the component relative to the page is changed may be understood as: the page remains unchanged, the position of the component changes. For example, the component is moved in response to a second operation. Specifically, the second operation (which is also referred to as a movement operation) may be a drag operation acting on the component. The terms "acting on" described here and elsewhere in the disclosure should be understood as including acting directly as well as acting indirectly such as performing an air operation. In addition, any area of the component may be set to be available for the drag operation. Alternatively, only a part of the area of the component may be set to be available for the drag operation. For example, FIG. 5 illustrates the area where the control locates, in response to a user's drag operation acting on the area where the control locates, the component moves to the bottom of the page as the drag operation. In some embodiments, the component may be moved up and down as well as left and right. In other embodiments, the component may be set to be moved up and down, or left and right. In some embodiments, in response to a movement operation acting on the component, the component is moved and the page maintains unchanged during the movement; updated second content is determined based on changed page content covered by the moved component; and the first content or the second content displayed by the component is updated based on the updated second content.

The position of the component being changed relative to the page may also be understood as: the position of the component remains unchanged, and the page changes. For example, the page changes in response to a third operation. Specifically, the third operation may be any operation such as sliding or clicking acting on the page. The third operation may be a changing operation acting on an area of the page except for the component. The operation of page changing may be understood as the displayed content of the page changes in response to the page being slid, flipped or jumped to other pages. Specifically, the terminal may slide, flip or redirect the page in response to any operation such as sliding or clicking acting on an area of the page other than the position of the component, which is not specifically limited in the embodiments. In some embodiments, in response to a changing operation acting on an area of the page except for the component, the page is changed and the component maintains unmoved during the changing; updated second content is determined based on changed page content covered by the component; and the first content or the second content displayed by the component is updated based on the updated second content.

Apparently, the position of the component being changed relative to the page may also be understood as: the positions of the component and the page change at the same time.

Figure 6:
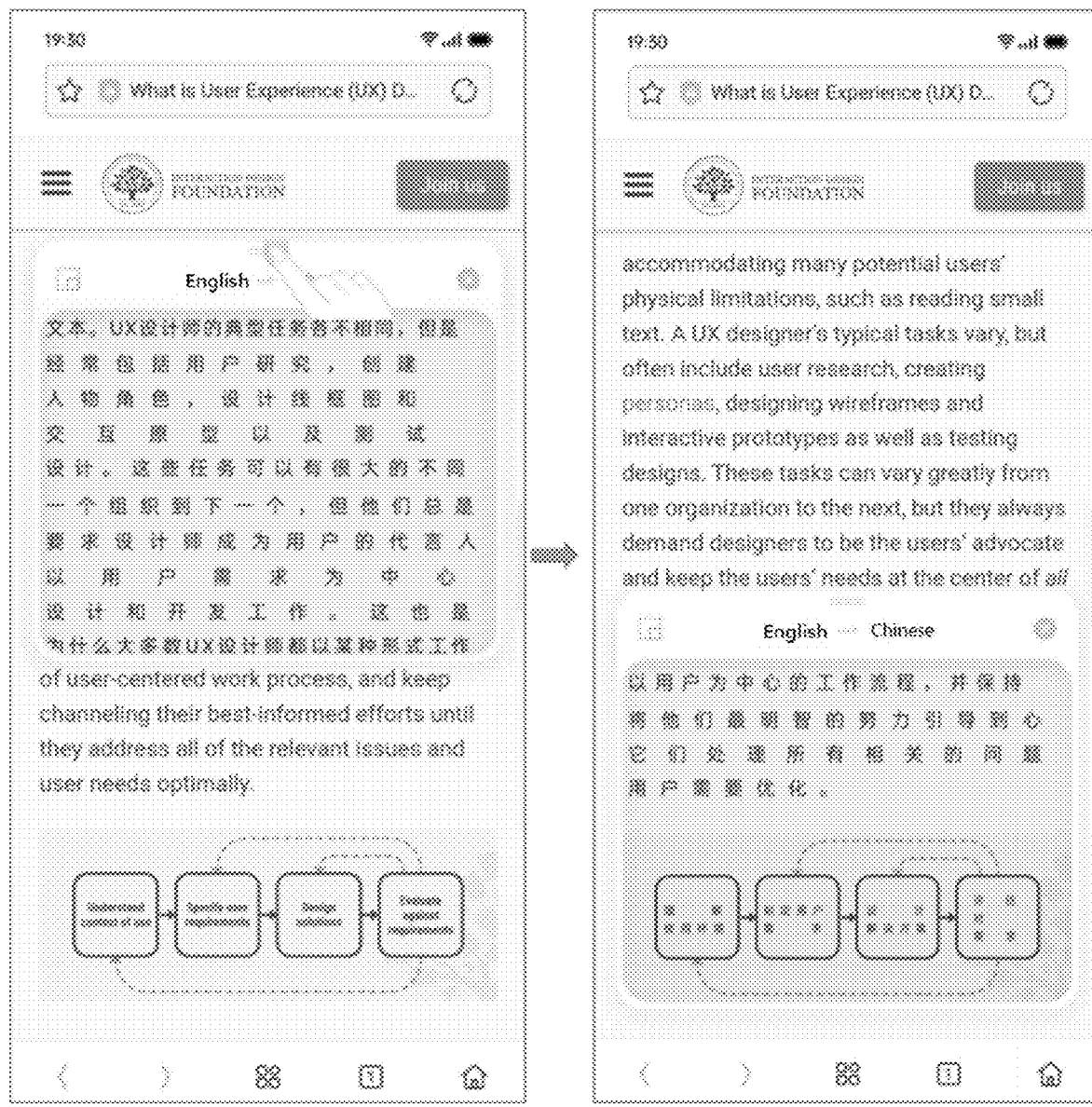
FIG. 6 is a schematic diagram illustrating another scenario for a page displaying method involving dragging the component according to some embodiment of the disclosure.
Figure 7:
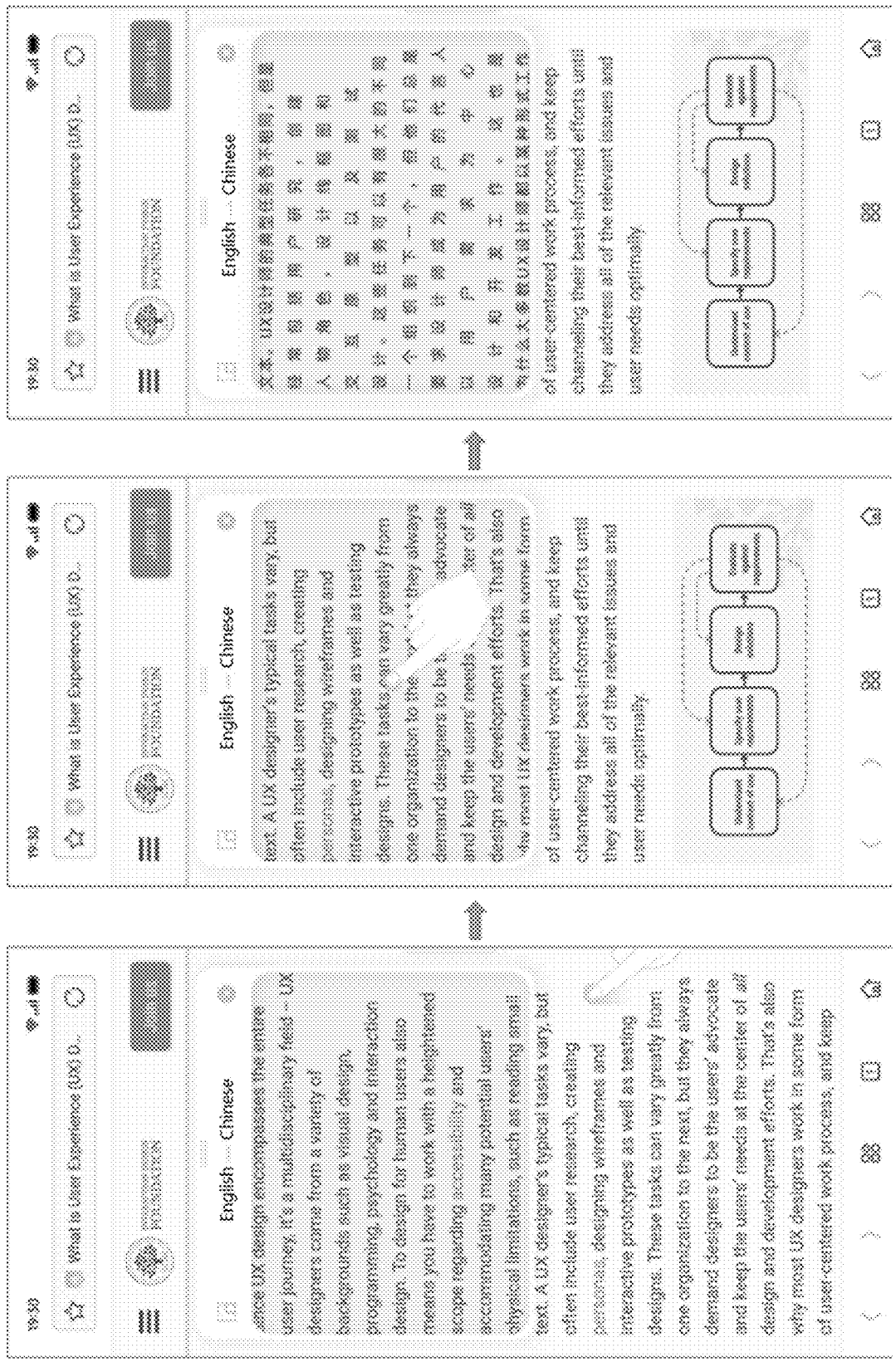
FIG. 7 is a schematic diagram illustrating a scenario for a page displaying method involving sliding a page according to some embodiment of the disclosure.

The operation of updating the first content or the second content may be understood as: the page covered by the component changes as the position of the component being changed relative to the page; and therefore, the second content or first content displayed by the component is updated accordingly, as illustrated in FIG. 5, FIG. 6 and FIG. 7. Specifically, in some embodiments, as illustrated in FIG. 5, when the component displays second content, in response to the component moving from the up to the bottom of the page, the content displayed by the component is updated to a portion of the content at the bottom of the page that is blocked by the component (as illustrated in the second image in FIG. 5). In some embodiments, as illustrated in FIG. 6, when the component displays the first content, in response to the component moving from the up to the bottom of the page, the first content displayed by the component is updated to another first content corresponding to a portion of the content at the bottom of the page that is blocked by the component. In some embodiments, as illustrated in FIG. 7, the component is always displayed on the screen, the page is scrolled into view in response to a user's sliding operation on the page, so that the page content covered by the component is changed, and the second content displayed by the component changes to the page content after the scrolling (as illustrated in the second image in FIG. 7). It should be noted that, the page content and the translation thereof illustrated in FIGS. 5-7 are only some examples of the first content and the second content in the disclosure, there may be other mapping relationships between the first content and the second content, and details are not repeated herein. In addition, one or more of various updating strategies may be used to update the first content. For example, in some embodiments, the terminal may acquire and display the first content in real time according to the movement of the position of the component and the page relative to each other. In some other embodiments, only after the component and the page have moved relative to each other to a certain position and remain stationary for more than a predetermined period (e.g., 0.5 seconds), the terminal may display the first content corresponding to the position, so as to avoid frequently obtaining the first content corresponding to the position and occupying terminal resources. Further, the terminal may update and display the first content in response to detecting that the relative movement has finished (i.e., a corresponding operation is released).

Through the solution of the embodiment of the disclosure, the user can conveniently search for the associated content corresponding to the target content. The user can select the target content through the component, so as to avoid the delay caused by directly mapping the entire page content, and achieve the precise correspondence between the target content and the associated content, which facilitates the user to learn and remember.

In some embodiments, the page displaying method further includes:

displaying the component in response to a fourth operation.

Specifically, the fourth operation may be any touch operation acting on the page, which includes one or more of a click operation, a sliding operation, a long-press operation, and the like. For example, the fourth operation may be a touch operation acting on the first control which is used to control the terminal to display the component on the current page. Furthermore, the fourth operation may also be a voice operation, such as a user's voice command of "initiate the translation". The fourth operation is not specifically limited to the embodiments.

In some embodiments, when the fourth operation is a touch operation acting on the first control, the page displaying method further includes:

displaying the first control on the page in response to a fifth operation.

Specifically, the fifth operation (which may be referred to as a displaying operation) may be any touch operation acting on the current page, which includes one or more of a click operation, a slide operation, a long press operation, and the like. For example, the fifth operation may be a sliding operation acting on the side edge of the touch screen or a pull-down/slide-up operation acting on the top/bottom of the touch screen, and the terminal display, in response to the fifth operation, the first control in the side bar (as illustrated in FIG. 4) or a pull-down/slide-up menu bar. In some embodiments, the fifth operation may be a non-touch operation, such as an operation of shaking the terminal. The fifth operation is not specifically limited in the embodiments. In addition, the terminal may display the first control in other areas of the page, which is not limited to the embodiments.

In this way, the component is called up by manipulating the control, and the first content corresponding to the second content is displayed in the component through the first operation, which ensures the user's interactive continuity during the information browsing operation, shortens the user's operation path, and at the same time, the component/the first control does not reside on the page, so as to avoid affecting the normal browsing of users.

In some embodiments, the page displaying method further includes:

changing a size of the component in response to a sixth operation.

Figure 8:
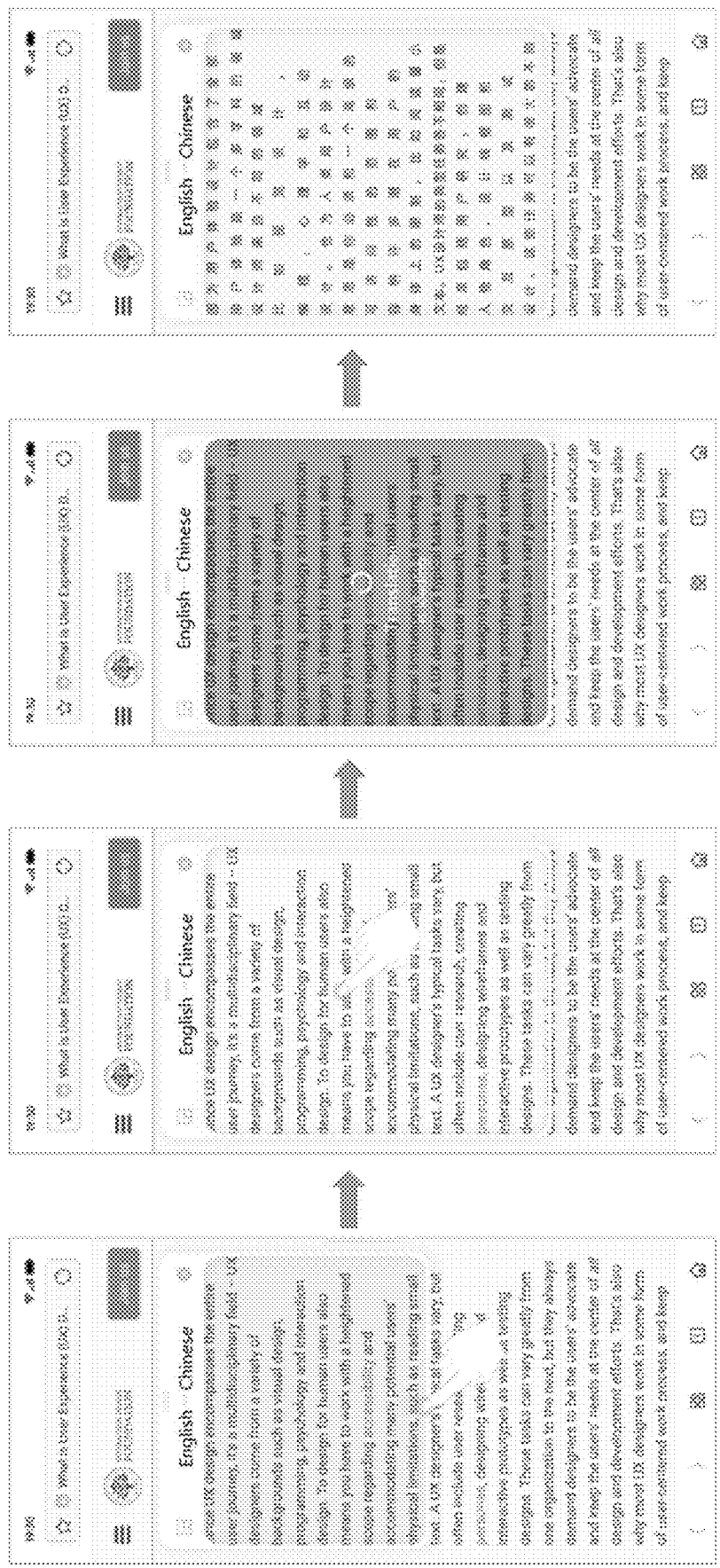
FIG. 8 is a schematic diagram illustrating a scenario for a page displaying method involving adjusting a size of the component according to some embodiment of the disclosure.

Specifically, the sixth operation may be an operation acting on the frame of the component; and the size of the component is changed in response to the sixth operation. For example, the sixth operation may be a drag operation, and the sixth operation may apparently be other operations. FIG. 8 illustrated an example of adjusting the size of the component, in which the sixth operation may be referred to as a drag operation acting on an edge of the component, the bottom edge of the component box is moved down to increase the size of the component in response to the user dragging the bottom edge of the component box downward. On the contrary, in response to the user dragging the bottom edge of the component box upwards, the bottom edge of the component box is moved up to decrease the size of the component.

In this way, the user may arbitrarily select the second content without waiting long for the terminal to obtain the first content of the entire page, and the size of the component may be adjusted to accurately obtain the mapping information corresponding to the target content, which facilitates the user to understand and learn.

In some embodiments, the component includes a floating window. Specifically, the floating window may include a first area and a second area. Specifically, the second content is the page content covered by the second area, and the second area is used to display the first content and/or second content. For example, as illustrated in FIG. 3, the second area of the floating window is referred to as b1 area, when the b1 area is transparent, the second content is displayed in the second area. Alternatively, the first content may be displayed in the b1 area. In some embodiments, the first area locates at the top area of the floating window, the second area locates at the bottom of the floating window. Apparently, the first area may locate at the left/right/bottom area of the floating window, and the second area may locate at the right/left/top area of the floating window accordingly. As shown in FIG. 3, the first area may display multiple contents which may include but are not limited to the following function virtual buttons: a copy virtual button for copying the text displayed in the second area, a language selection virtual button for selecting the language of the text to be translated and the translation target language, and a turn-off virtual button for turning off the floating window, and the like. It can be understood that, in response to the copy virtual button being triggered, the terminal copies part or entire of the content in the first area; in response to triggering the language selection virtual button, the terminal displays a list of selectable languages for the user to choose; and in response to the turn-off virtual button being triggered, the terminal closes the floating window and exits the translation.

In an exemplary application scenario, the terminal may receive a drag operation acting on the first area; the floating window is moved in response to the drag operation; the content displayed in the second area may be switched between the first content and the second content, in response to a user's click operation acting on the second area.

In the embodiments of the disclosure, when the first area displays the translation, the user may drag the floating window to directly translate the target content. As such, no further tedious operations are required, so as to ensure the efficiency and fluency of performing page translation by the user. In addition, the user can accurately correspond the original text to the translation by performing the translation by moving the floating window, which helps the user to understand and learn.

In some embodiments, the page displaying method further includes:

sliding the first content in response to a seventh operation.

In at least one alternative embodiments, the seventh operation may be an operation acting on the second area. It can be understood that, when the first content mapped by the second content is displayed in the second area, a display area for completely displaying the first content after the mapping may be larger than the second area. Based on the above, in some embodiments, the terminal may slide the first content in response to the seventh operation acting on the second area. Further, the seventh operation may be a sliding operation acting on the second area. The operation of "sliding the first content in response to a seventh operation" may be understood as: the first content is displayed in the second area in a sliding manner. Furthermore, such operation may be understood as: first sub-content in the first content is displayed in the second area, and second sub-content in the first content is displayed in the second area in response to the seventh operation. In at least one alternative embodiments, the first content may be displayed in the sliding manner with the sliding operation. In some other embodiments, the terminal may also automatically adjust a display size of the first content according to the length of the first content, so that the first content can be completely displayed in the second display area.

In an exemplary application scenario, since the same paragraph of text in different languages have different lengths, the display area required for the translation may be larger than the display area for the first content when a same font size is used for displaying the same paragraph of text and the translation. Therefore, in some embodiments where the translation is displayed with the same font size as the text in the second content, when the display area required for the translation exceeds the second display area, the translation is displayed in the sliding manner upon receiving a sliding operation acting on the second display area. That is, the display area required for displaying the first content completely is determined; and in response to the display area being greater than the second area, the first content is displayed in the second area in the sliding manner along with the sliding operation acting on the second area. In addition, in some other embodiments, the terminal may also automatically adjust the display font size of the translation according to the length of the translation, so that the translation can be completely displayed in the second display area. That is, the display area required for completely displaying the first content with the same font size as a text in the second content is determined; and in response to the display area being greater than the second area, a target font size is determined according to the length of the first content, thereby displaying the first content completely in the second area with the target front size.

In the embodiments of the disclosure, the user can drag the floating window to select the content to be translated conveniently, so as to avoid the delay caused by directly translating the content of the entire page when only the target content needs to be translated, and ensure the smoothness of user interaction during the page translation. In addition, by moving the floating window to translate, the user can accurately correspond the original text to the translated text, which facilitates the user to understand and learn.

In some embodiments, the second area is further configured to display first prompt information and/or second prompt information.

The first prompt information is used to prompt the user to input or perform the first operation. Specifically, the first prompt may be prompts such as "click to view photo", "click to view plant name", "click to view associated tasks", "click the floating window to view translation", "click to view the translation", "click to translate", or other prompts. The first prompt information of the embodiments is not specifically limited to these examples. As such, by providing operation prompts when the user selects the target content for translation, the process of performing the operation is enabled to be clear and straightforward, which improves the user's operational efficiency.

The second prompt message is used to prompt the user that the first content is loading. In addition, there may be cases where the terminal fails to load the first content, for example, it is determined that the loading of the first content fails when the terminal does not successfully load the first content within a predetermined duration (e.g., 10 seconds). When it is determined that the loading of the first content fails, the terminal may display third prompt information in the second area, in which the third prompt information is used to indicate to the user that the loading of the first content fails. Further, a fourth prompt message may be displayed to prompt the user to check the network or reconnect to the network. The first content being loaded successfully may be understood as: the terminal has acquired the first content corresponding to the entire second content.

Figure 9:
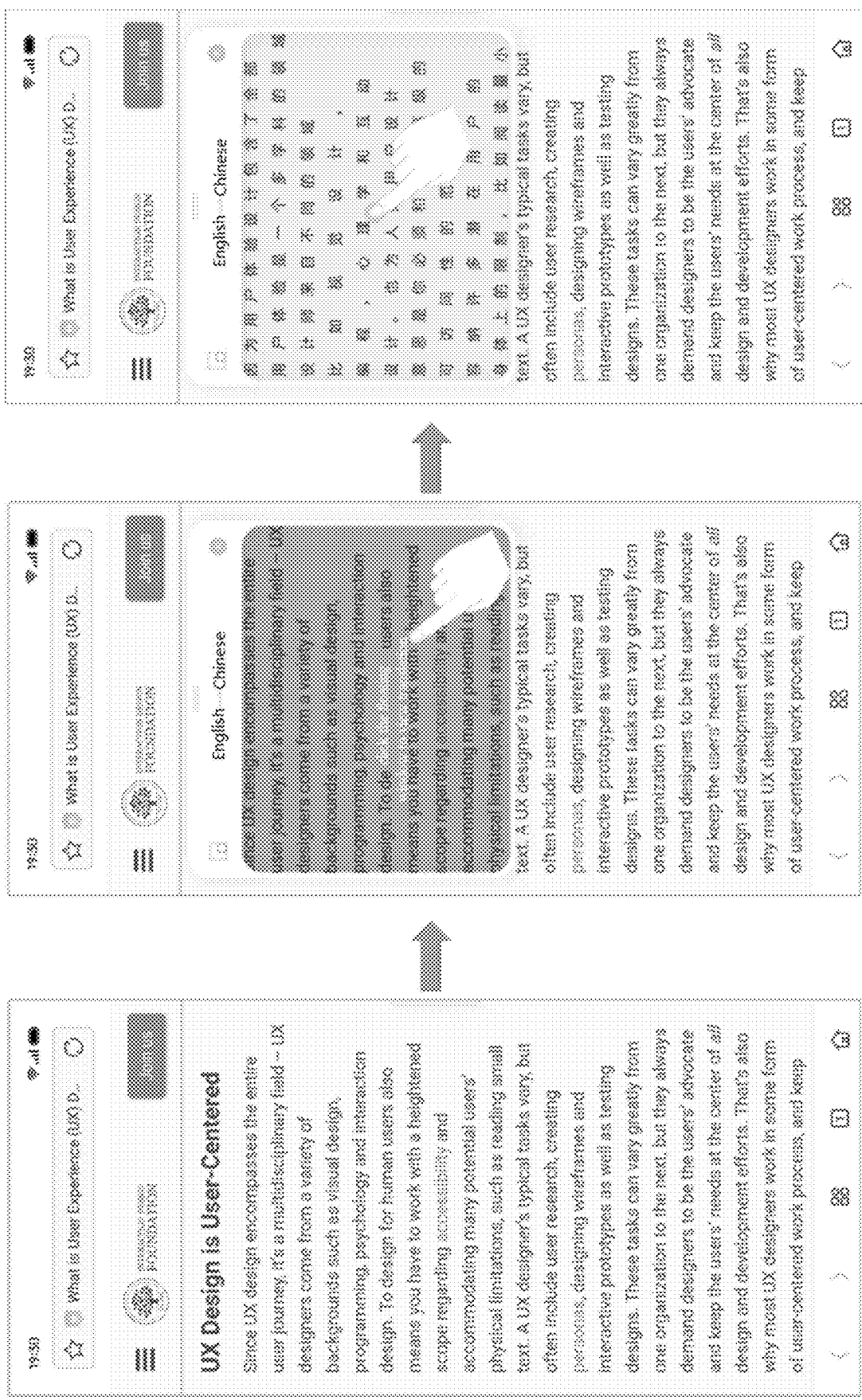
FIG. 9 is a schematic diagram illustrating a scenario for a page displaying method involving first prompt information according to some embodiment of the disclosure.
Figure 10:
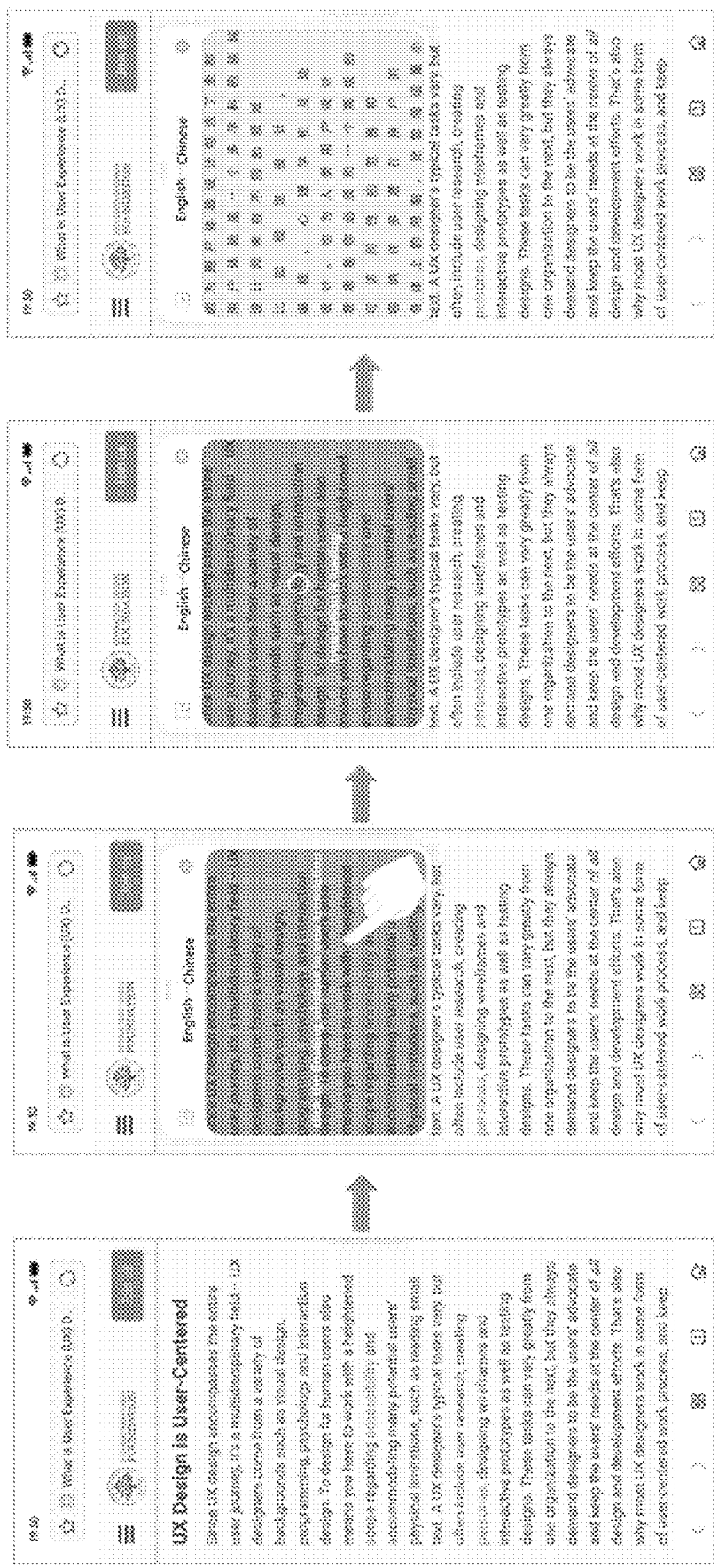
FIG. 10 is a schematic diagram illustrating a scenario for a page displaying method involving second prompt information according to some embodiment of the disclosure.

In some embodiments, the prompt information may be displayed with the second area being a transparent background, in which the transparent background may be understood as the area of the second area except for the location of the prompt information being in a transparent state. In some other embodiments, the prompt information may be displayed with the second area being other backgrounds such as translucent, masked layer (as shown in FIG. 9-10) or other patterns to emphasize the visual effect of the prompt information.

In an application scenario, in response to a user's sliding acting on a side of the terminal, the terminal displays a control of "screen translation" on the interface, and a floating window is displayed on the interface in response to a user's click acting on the control. The floating window includes a display box and a menus bar, the display box displays "click to acquire the translation". In response to a user's click acting on an area within the display box, the terminal begins to load the translation and display "translation in progress" in the display box, when the loading is completed, the translation corresponding to the original text covered by the display box is displayed in the display box. In response to detecting another user's click acting on the area within the display box, the display box changes to transparent, and the original text is displayed in the display box. The user may drag the menu bar of the floating window to move the floating window, or manipulate the page by acting on the page area outside the floating window. In addition, the user may drag the border of the display box to adjust the size of the floating window. Further, when the display box cannot display the complete translation therein, a slider will be displayed on the right side of the display box, and the user may slide the translation box or the slider to display the translation in the display box in the sliding manner.

In the embodiments of the disclosure, when the floating window remains unmoved, the user may slide the area outside the floating window to slide the current page, so as to view the content of the whole page smoothly. In addition, updating the translation in the floating window by sliding the page also diversifies the user's selection operation for the target translation content, which is compatible with the user's interaction habits and ensures the fluency and convenience of the whole user's interaction process. Furthermore, it also facilitates the user to accurately match the original text with the translation, which is helpful for the user's understanding and learning.

Figure 11:
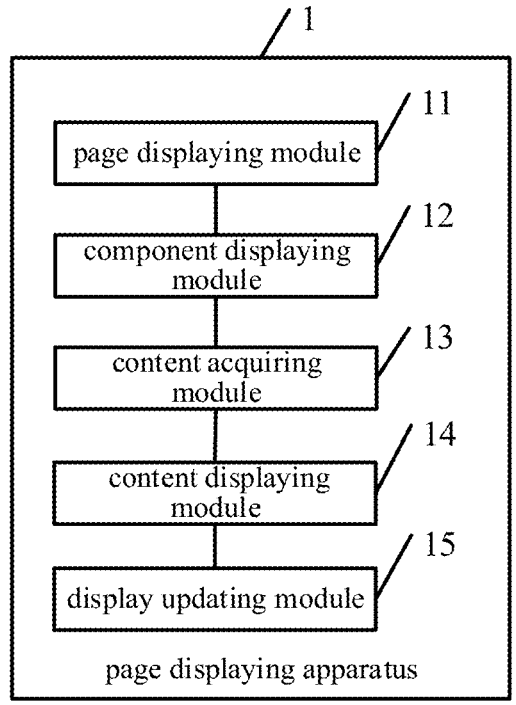
FIG. 11 is a schematic structural diagram illustrating a page displaying apparatus according to some embodiment of the disclosure.

FIG. 11 is a schematic structural diagram illustrating a page displaying apparatus according to some exemplary embodiment of the disclosure. The page displaying apparatus may be implemented as all or a portion of a device through software, hardware or a combination thereof. The apparatus 1 includes a page displaying module 11, a component displaying module 12, a content acquiring module 13, a content displaying module 14 and a display updating module 15.

The page displaying module 11 is configured to display a page.

The component displaying module 12 is configured to display at least one component on a page.

The content acquiring module 13 is configured to acquire first content, the first content has a mapping relationship with second content, and the second content is entire or part of page content covered by the component.

The content displaying module 14 is configured to display the first content in the component.

The content updating module 15 is configured to update the first content in response to a position of the component being changed relative to the page.

In at least one alternative embodiment, the apparatus 1 may further include:
an operation receiving module 16 configured to receive at least one of first to seventh operation operations.

Specifically, the first operation is configured to instruct the content displaying module 14 to control the component to switch the displayed content between the first content and the second content.

The second operation is configured to instruct the component displaying module 12 to move and display the component.

The third operation is configured to instruct the page displaying module 11 to change the displayed page.

The fourth operation is configured to instruct the component displaying module 12 to display the component on the page.

The fifth operation is configured to instruct the page displaying module 11 to display a first control on the page.

The sixth operation is configured to instruct the component displaying module 12 to change a display size of the component.

The seventh operation is configured to instruct the content displaying module 14 to display the first content in a sliding manner.

Figure 12:
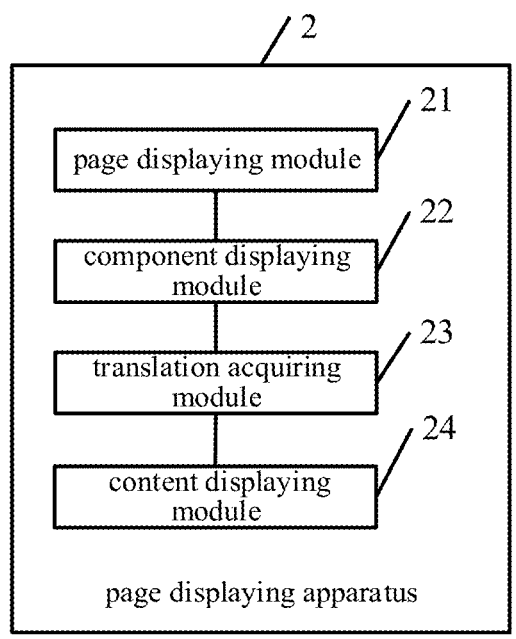
FIG. 12 is a schematic structural diagram illustrating another page displaying apparatus according to some embodiment of the disclosure.

FIG. 12 illustrates a schematic structural diagram illustrating another page displaying apparatus according to other exemplary embodiments of the disclosure. The page displaying apparatus may be implemented as all or a part of a device through software, hardware or a combination thereof. The apparatus 2 includes a page displaying module 21, a component displaying module 22, a translation acquiring module 23 and a content displaying module 24.

The page displaying module 21 is configured to display a page.

The component displaying module 22 is configured to display at least one component on the page.

The translation acquiring module 23 is configured to acquire the first content, the first content is a translation of second content, and the second content is entire or part of page content covered by the component.

The content displaying module 24 is configured to display the first content in the component.

In at least one alternative embodiment, the content displaying module 24 is further configured to display the second content in the component.

The apparatus 2 may further include a content updating module 25 and an operation receiving module 26.

The content updating module 25 is configured to update the first content or the second content in response to a position of the component being changed relative to the page.

The operation receiving module 26 is configured to receive at least one of first to seventh operation operations.

Specifically, the first operation is configured to instruct the content displaying module 23 to control the component to switch the displayed content between the first content and the second content.

The second operation is configured to instruct the component displaying module 22 to move and display the component.

The third operation is configured to instruct the page displaying module 21 to change the displayed page.

The fourth operation is configured to instruct the component displaying module 22 to display the component on the page.

The fifth operation is configured to instruct the page displaying module 21 to display a first control on the page.

The sixth operation is configured to instruct the component displaying module 22 to change a display size of the component.

The seventh operation is configured to instruct the content displaying module 24 to display the first content in a sliding manner.

It should be noted that, when the page displaying apparatus provided in the foregoing embodiments implements the page displaying method, the division of the foregoing functional modules is merely an example for description. In practice, functions may be assigned to and completed by different functional modules according to the requirements, that is, the internal structure of the device is divided into different functional modules to implement all or some of the functions described above. In addition, the page displaying apparatus and page displaying method embodiments provided in the foregoing embodiments belong to the same concept. For the specific implementation process, reference may be made to the method embodiments, and details are not described herein again.

The above serial numbers of the embodiments of the disclosure are for the purpose of description only and do not represent the advantages or disadvantages of the embodiments.

The embodiments of the disclosure further provide a computer storage medium. The computer storage medium is stored with multiple instructions which are configured to be loaded and executed by a processor to implement the page displaying method according to the embodiments illustrated in FIGS. 1 to 10. For the specific implementation process, reference may be made to the embodiments illustrated in FIGS. 1 to 10, and details are not described herein again.

The embodiments of the disclosure further provide a computer program product. The computer program product is stored with at least one instruction which is configured to be loaded and executed by a processor to implement the page displaying method according to the embodiments illustrated in FIGS. 1 to 10. For the specific implementation process, reference may be made to the embodiments illustrated in FIGS. 1 to 10, and details are not described herein again.

Figure 13:
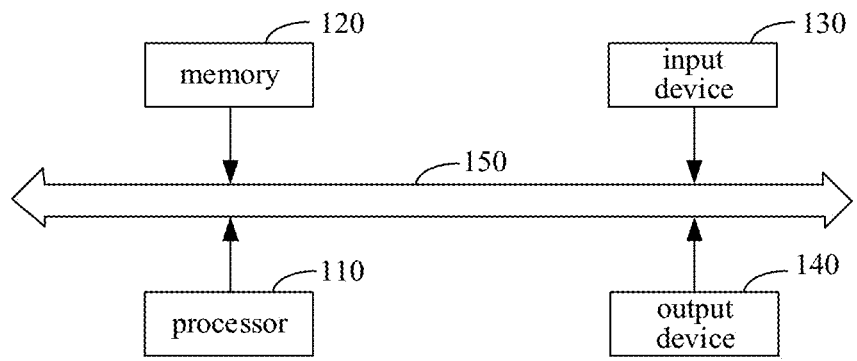
FIG. 13 is a schematic structural diagram illustrating an electronic device according to some embodiment of the disclosure.

FIG. 13 is a schematic structural diagram illustrating an electronic device according to some embodiment of the disclosure. The electronic device of the disclosure may include one or more elements: a processor 110, a memory 120, an input device 130, an output device 140 and a bus 150. The processor 110, the memory 120, the input device 130 and the output device 140 may be connected via the bus 150.

The processor 110 may include one or more processing cores. The processor 110 uses various interfaces and lines to connect various parts in the whole electronic device 100, and performs various functions and data processing of the electronic device 100 by running or executing instructions, programs, code sets or instruction sets stored in the memory 120 and calling data stored in the memory 120. Alternatively, the processor 110 may be implemented in at least one hardware form of digital signal processing (DSP), field-programmable gate array (FPGA) and programmable logic array (PLA). The processor 110 may integrate one or more combinations of a central processing unit (CPU), a graphics processing unit (GPU), and a modem (also referred to as modulator-demodulator). Specifically, the CPU mainly deals with operating system, user interface and application program; the GPU is used to render and draw the displayed content; and the modem is used to handle wireless communications. It can be understood that the above modem can also be realized by a single communication chip without being integrated into the processor 110.

The memory 120 may include a random access memory (RAM) or a read only memory (ROM). In at least one alternative embodiment, the memory 120 includes a non-transitory computer-readable storage medium. The memory 120 may be used to store instructions, programs, codes, code sets, or instruction sets. The memory 120 may include a program storage area and a data storage area. The storage program area may store instructions for realizing the operating system, instructions for realizing at least one function (for example, a touch function, a sound playback function, an image playback function), instructions for implementing the method embodiments, or the like. The operating system may be an Android system which includes a system based on the deep development of the Android system, an IOS system developed by Apple which includes a system based on the deep development of the IOS system or other systems. The data storage area may further store data such as an address book, audio and video data, and chat record data, created by the electronic device in use.

Figure 14:
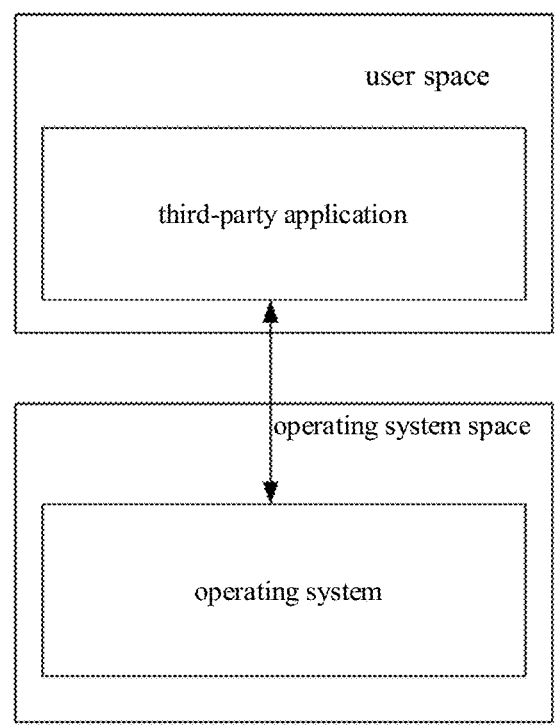
FIG. 14 is a schematic structural diagram illustrating an operating system and a user space according to some embodiment of the disclosure.

As illustrated in FIG. 14, the memory 120 may include an operating system space and a user space. The operating system runs in the operating system space, and native and third-party applications run in the user space. In order to ensure that different third-party applications can achieve a good operation effect, the operating system allocates corresponding system resources for different third-party applications. However, different application scenarios in the same third-party application also have different requirements for the system resources. For example, in a scenario of loading local resources, the third-party application has a high requirement on a disk reading speed, and in a scenario of rendering animation, the third-party application has a high requirement on GPU performance. Since the operating system and the third-party application are independent of each other, and the operating system often fails to perceive the current application scenario of the third-party application in time, so that the operating system cannot allocate targeted system resources according to specific application scenarios of the third-party application.

In order to enable the operating system to distinguish the specific application scenarios of a third-party application, it is necessary to establish data communication between the third-party application and the operating system, so that the operating system may obtain information of a current scenario of the third-party application at any time and then allocates targeted system resources based on the current scenario.

Figure 15:
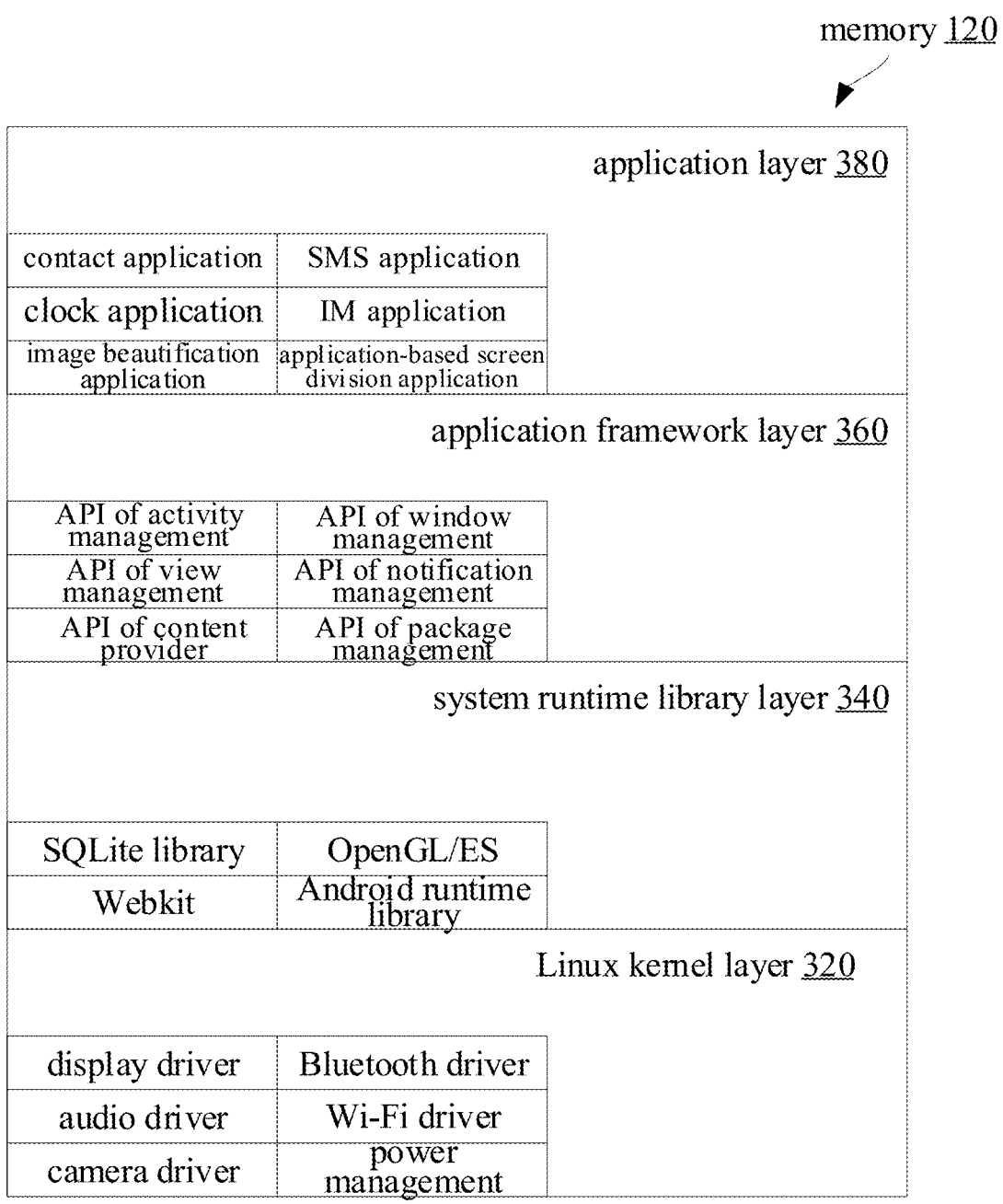
FIG. 15 is an architecture diagram illustrating an Android operating system in FIG. 14.

Taking the Android operating system as an example, programs and data stored in the memory 120 are shown in FIG. 15, and the memory 120 may store a Linux kernel layer 320, a system runtime library layer 340, an application framework layer 360, and an application layer 380. The Linux kernel layer 320, the system runtime library layer 340, and the application framework layer 360 belong to the operating system space, and the application layer 380 belongs to the user space. The Linux kernel layer 320 provides low-level drivers for various hardwares of the electronic device 100, such as a display driver, an audio driver, a camera driver, a Bluetooth driver, a Wi-Fi driver, and power management. The system runtime library layer 340 provides major feature supports for the Android system through some C/C++ libraries. For example, the SQLite library provides supports for database, the OpenGL/ES library provides supports for 3D drawing, and the Webkit library provides supports for browser kernel. An Android runtime library is also provided in the system runtime library layer 340, which mainly provides some core libraries that can allow developers to program Android applications using the Java language. The application framework layer 360 provides various APIs that may be used when programming applications, and developers can also use these APIs to program their own applications, such as an API of activity management, an API of window management, an API of view management, an API of notification management, an API of content provider, an API of package management, an API of call management, an API of resource management, an API of positioning management. At least one application runs in the application layer 380, and these applications may be native applications programmed in the operating system, such as a contact application, a short messaging service (SMS) application, a clock application, a camera application, etc., or may be third-party applications developed by a third-party developer, such as game applications, instant messaging (IM) applications, photo beautification applications, shopping applications, etc.

Figure 16:
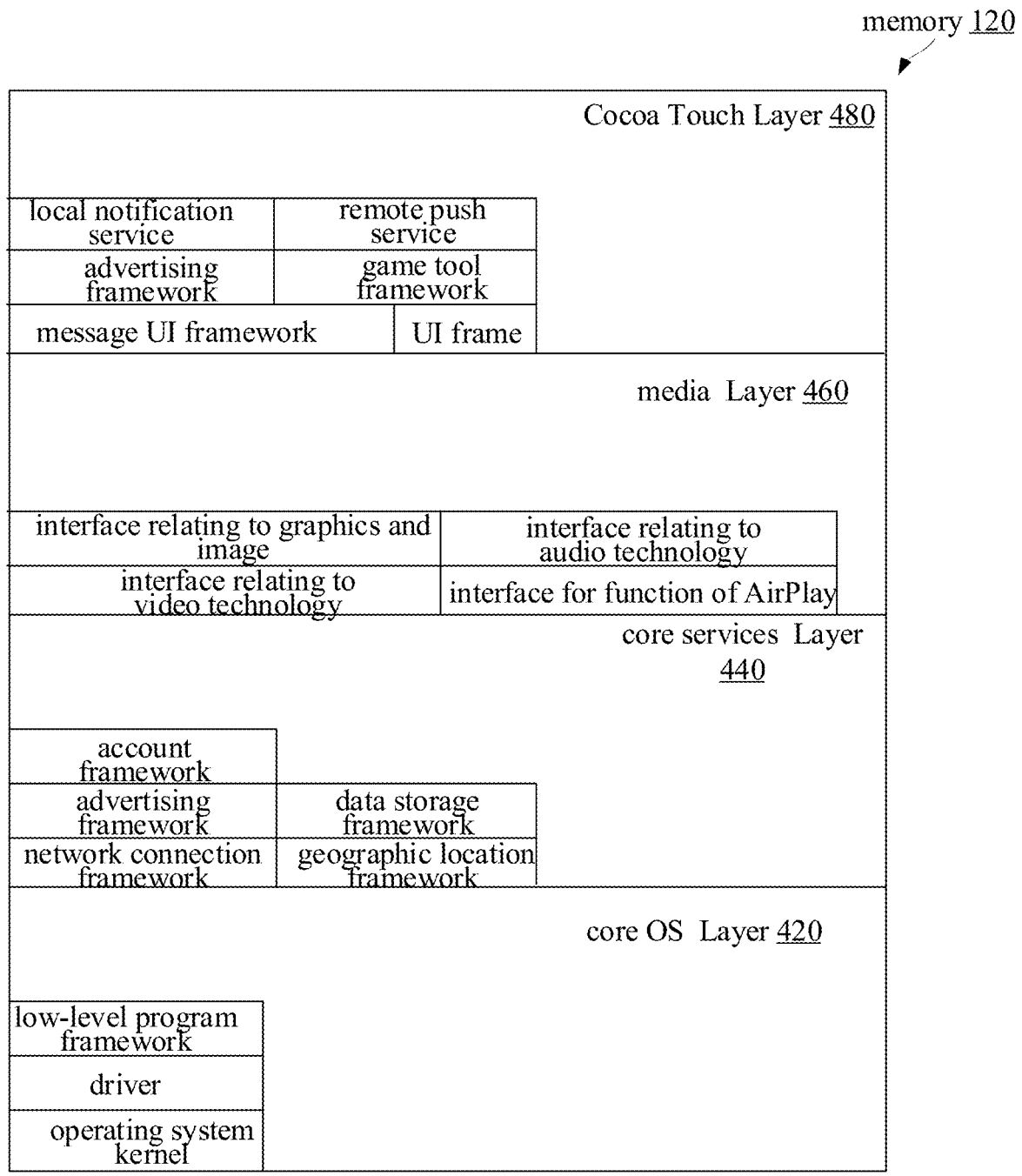
FIG. 16 is an architecture diagram illustrating an IOS operating system in FIG. 14.

Taking the operating system being an IOS system as an example, programs and data stored in the memory 120 are shown in FIG. 16. The IOS system includes a core operating system layer (also referred to as Core OS layer) 420, a core services layer 440, and a media layer 460, and a Cocoa Touch Layer 480. The core operating system layer 420 includes an operating system kernel, a driver, and a low-level program framework. The low-level program framework provides functions being more approximate to the hardware, which are provided for program frameworks in the core service layer 440. The core service layer 440 provides system services and/or program frameworks required by applications, such as a foundation framework, an account framework, an advertising framework, a data storage framework, a network connection framework, a geographic location framework, and a sports framework. The media layer 460 provides audio-visual interfaces for applications, such as an interface relating to graphics and images, an interface relating to audio technology, an interface relating to video technology, and an AirPlay interface for audio and video transmission technology. The Cocoa Touch layer 480 provides frameworks relating to various commonly-used interfaces for application development. The Cocoa Touch layer 480 is responsible for user's touch interaction operations on the electronic device 100, such as a local notification service, a remote push service, an advertising framework, a game tool framework, a message user interface (UI) framework, a user interface UIKit framework, a map framework, etc.

In the framework shown in FIG. 16, frameworks related to most applications include, but are not limited to, the foundation framework in the core service layer 440 and the UIKit framework in the Cocoa Touch layer 480. The foundation framework provides many basic object-classes and data-types and provides the most basic system services for all applications, regardless of the UI. Classes provided by the UIKit framework is a basic UI class library for creating a touch-based user interface. IOS applications can provide an UI based on the UIKit framework. Therefore, the UIKit framework provides a basic architecture of an application and is used for building user interfaces, drawing and handling interaction events, responding to gestures, etc.

The mode and principle of data communication between a third-party application and the operating system in the IOS system can refer to that in the Android system, which will not be repeated here.

The input device 130 is used for receiving input instructions or data, and the input device 130 includes but is not limited to a keyboard, a mouse, a camera, a microphone or a touch device. The output device 140 is used for outputting instructions or data, and the output device 140 includes, but is not limited to, a display device, a speaker, and the like. In an example, the input device 130 and the output device 140 may be integrated in an input/output device, the input device 130 and the output device 140 may be integrated as a touch display screen for receiving a user's touch operation thereon or near the touch display screen, that is from any suitable object such as a finger, a touch pen, and for displaying user interfaces of various applications. The touch display screen is usually set at the front of the terminal. The touch display screen may be designed as a full screen, curved screen, or special-shaped screen. The touch display screen may also be designed as a combination of a full screen and a curved screen, and a combination of a special-shaped screen and a curved screen, which is not limited to embodiments of the disclosure In addition, those skilled in the art may understand that the structure of the terminal shown in the above drawings does not constitute a limitation on the terminal, and the terminal may include more or fewer parts than that as shown in drawings, combine certain parts, or have different component arrangements. For example, the terminal also includes components such as a radio frequency circuit, an input unit, a sensor, an audio circuit, a wireless fidelity (Wi-Fi) module, a power supply, and a Bluetooth module, which will not be described here.

In the embodiments of the disclosure, the execution subject of various actions/operations may be the electronic device as described above. Alternatively, the execution subject of various actions/operations may be the operating system of the electronic device as described above. The operating system may be an Android system, an IOS system, or other operating systems, which are not limited in the embodiments of the disclosure.

In the above-mentioned embodiments, the description of each embodiment has its own emphasis. For parts that are not described in detail in a certain embodiment, reference may be made to the relevant descriptions of other embodiments.

In the several embodiments provided in this disclosure, it should be understood that the disclosed apparatus may be implemented in other ways. For example, the apparatus embodiments described above are merely illustrative. For example, the division of the units is only a logical function division, and there may be other divisions in practice, for example, multiple units or elements may be combined or may be integrated into another system, or some features may be omitted or not implemented. In addition, the displayed or discussed mutual couplings, direct couplings or communication connections may be implemented as indirect couplings or communication connections through some service interfaces, apparatus or units, and may be in electrical or other forms.

The functional units in the various embodiments of the present disclosure may be integrated into one processing unit, or each unit may exist alone physically, or two or more units may be integrated into one unit. The above-mentioned integrated unit can be implemented in the form of hardware or software functional unit.

Alternatively, when the integrated unit in the disclosure is implemented in a form of a software function unit and sold or used as an independent product, the integrated unit may also be stored in a computer-readable storage ROM. Based on such an understanding, the technical solutions of the disclosure essentially or the part contributing to the prior art may be implemented in a form of a software product. The computer software product is stored in a memory and includes several instructions for instructing a computer device (which may be a personal computer, a server, or a network device, and the like.) to execute all or part of the methods described in the embodiments of the disclosure. The aforementioned memory includes: a USB flash drive, a Read-Only Memory (ROM), a Random Access Memory (RAM), a mobile hard drive, a disk or a CD-ROM, and other media that can store program code.

The above are only exemplary embodiments of the present disclosure, and the scope of the present disclosure cannot be limited by this. That is, all equivalent changes and modifications made in accordance with the teachings of the present disclosure still fall within the scope of the present disclosure. Those skilled in the art will easily think of other embodiments of the present disclosure after considering the specification and practicing the disclosure herein. This application is intended to cover any variations, uses, or adaptive changes of the present disclosure. These variations, uses, or adaptive changes follow the general principles of the present disclosure and include common knowledge or conventional technical means in the technical field that is not recorded in the present disclosure. The description and the embodiments are only regarded as exemplary, and the scope and spirit of the present disclosure are defined by the claims.

What is claimed is:

1. A page displaying method, performed by a terminal, wherein the method comprises:
    displaying at least one component on a page, wherein the component is configured to display first content, the first content has a mapping relationship with second content, and the second content is entire or part of page content covered by the component; and
    updating the first content in response to a position of the component being changed relative to the page, comprising:
        changing, in response to a third operation acting on an area of the page except for the component, the page without moving the component relative to a screen of the terminal;
        determining updated second content based on changed page content covered by the component; and
        updating, based on the updated second content, the first content displayed by the component.

2. The method as claimed in claim 1, wherein the component comprises at least one of a control and a display box.

3. The method as claimed in claim 1, wherein the mapping relationship comprises at least one selected from the group consisting of a mapping between texts, a mapping between text and an image, a mapping between images, a mapping between text and a video, a mapping between an image and a video, and a mapping between videos.

4. The method as claimed in claim 1, wherein the mapping relationship comprises at least one selected from the group consisting of a mapping between a word and a translation of the word, a mapping between a noun and an image corresponding to the noun, a mapping between a name and an image corresponding to the name, a mapping between an image and another image associated with the image, a mapping between a character name and a video corresponding to the character name, a mapping between a program name and a video corresponding to the program name, a mapping between a character image and a video corresponding to the character image, and a mapping between a video and another video associated with the video.

5. The method as claimed in claim 1, wherein the component is further configured to display the second content; and the method further comprises:
    switching, in response to a switching operation, content displayed by the component between the first content and the second content.

6. A page displaying method, performed by a terminal, wherein the method comprises:
    displaying at least one component on a page, wherein the component is configured to display first content, the first content is a translation of second content, and the second content is entire or part of page content covered by the component;
    wherein the at least one component comprises a floating window, the floating window comprises a first area and a second area, the first area is configured to display at least one function virtual button, the second content is page content covered by the second area, and the second area is configured to display the first content, and
    the method further comprises:
        determining a display area required for completely displaying the first content with a same font size as a text in the second content; and
        in response to the display area being greater than the second area, determining, according to a length of the first content, a target font size to thereby display the first content completely in the second area with the target font size.

7. The method as claimed in claim 6, wherein the component is further configured to display the second content, and the method further comprises:
    switching, in response to a switching operation, content displayed by the component between the first content and the second content.

8. The method as claimed in claim 7, further comprising:
    updating the first content or the second content in response to a position of the component being changed relative to the page.

9. The method as claimed in claim 8, wherein the updating the first content or the second content in response to a position of the component being changed relative to the page, comprises:
    moving, in response to a movement operation acting on the component, the component on the page and maintaining the page unchanged during the movement;
    determining updated second content based on changed page content covered by the moved component; and
    updating, based on the updated second content, the first content or the second content displayed by the component.

10. The method as claimed in claim 8, wherein the updating the first content or the second content in response to a position of the component being changed relative to the page, comprises:
    changing, in response to a changing operation acting on an area of the page except for the component, the page without moving the component relative to a screen of the terminal; and
    determining updated second content based on changed page content covered by the component; and
    updating, based on the updated second content, the first content or the second content displayed by the component.

11. The method as claimed in claim 8, wherein the updating the first content or the second content, comprises:

when the component displays the first content, updating, based on changed page content covered by the component, the first content in response to the position of the component being changed relative to the page; or when the component displays the second content, updating, based on changed page content covered by the component, the second content in response to the position of the component being changed relative to the page.

12. The method as claimed in claim 6, wherein before the displaying at least one component on the page, the method further comprising:
displaying a control on the page in response to a displaying operation acting on the page; and
displaying the component in response to a touch operation acting on the control.

13. The method as claimed in claim 12, wherein the component comprises a display box, the method further comprises:
displaying, in response to a click operation acting in the display box, the first content on the display box; and
setting, in response to another click operation acting on the display box, the display box to be in a transparent state, thereby displaying the second content in the display box.

14. The method as claimed in claim 6, further comprising:
changing a size of the component in response to a drag operation acting on an edge of the component;
determining updated second content based on changed page content covered by the changed component; and
updating, based on the updated second content, the first content or the second content displayed by the component.

15. The method as claimed in claim 6, wherein the second area is further configured to display at least one of first prompt information and second prompt information;
the first prompt information is configured to prompt the user to input a switching operation, wherein the switching operation is configured to switch the content displayed by the component between the first content and the second content; and
the second prompt information is configured to prompt the user that the translation is being loaded.

16. The method as claimed in claim 6, wherein a first translation target language and a second translation target language are set, the first translation target language has a higher priority than the second translation target language, and the method further comprises:
in response to text to be translated of the second content not belonging to the first translation target language, taking the first translation target language as a translation language for the second content;
in response to the text to be translated of the second content belonging to the first translation target language, taking the second translation target language as the translation language for the second content.

17. An electronic device, comprising a processor and a memory stored with a computer program, wherein the computer program is configured to be loaded and executed by the processor to implement a page displaying method, comprising:
displaying first content by at least one component on a page, wherein the first content is a translation of second content, and the second content is entire or part of page content in an overlapped area between the component and the page; and
updating the displayed first content in response to a position of the component being changed relative to the page;
wherein the at least one component comprises a floating window, the floating window comprises a first area and a second area, the first area is configured to display at least one function virtual button, the second content is page content covered by the second area, and the second area is configured to display the first content, and
the method further comprises:
determining a display area required for completely displaying the first content with a same font size as a text in the second content; and
in response to the display area being greater than the second area, determining, according to a length of the first content, a target font size to thereby display the first content completely in the second area with the target font size.

18. The electronic device as claimed in claim 17, wherein the component is further configured to display the second content, and the method further comprises:
changing, in response to a third operation acting on an area of the page except for the component, the page without moving the component relative to a screen of the terminal;
determining updated second content based on changed page content covered by the component; and
updating, based on the updated second content, the first content or the second content displayed by the component.

19. The electronic device as claimed in claim 17, wherein the component is further configured to display the second content, and the method further comprises:
switching, in response to a switching operation, content displayed by the component between the first content and the second content.

20. The electronic device as claimed in claim 17, wherein a first translation target language and a second translation target language are set, the first translation target language has a higher priority than the second translation target language, and the method further comprises:
in response to text to be translated of the second content not belonging to the first translation target language, taking the first translation target language as a translation language for the second content;
in response to the text to be translated of the second content belonging to the first translation target language, taking the second translation target language as the translation language for the second content.

* * * * *